United States Patent [19]
Wadell

[11] Patent Number: 5,462,152
[45] Date of Patent: * Oct. 31, 1995

[54] GRIPPING AND REMOVING ARTICLES FROM A GROOVED SURFACE

[75] Inventor: Lars G. A. Wadell, Aengelholm, Sweden

[73] Assignee: Nestec S.A., Vevey, Switzerland

[*] Notice: The portion of the term of this patent subsequent to Sep. 20, 2011, has been disclaimed.

[21] Appl. No.: 303,715

[22] Filed: Sep. 9, 1994

Related U.S. Application Data

[63] Continuation of Ser. No. 146,954, Nov. 3, 1993, Pat. No. 5,348,134.

[30] Foreign Application Priority Data

Dec. 1, 1992 [EP] European Pat. Off. ............ 92120460

[51] Int. Cl.⁶ .................................................. B65G 47/22
[52] U.S. Cl. .................... 198/409; 198/468.6; 198/468.8
[58] Field of Search .................. 198/409, 468.6, 198/468.8, 406, 468.2, 470.1, 506, 803.3; 294/103.1

[56] References Cited

U.S. PATENT DOCUMENTS

| | | | |
|---|---|---|---|
| 3,882,991 | 5/1975 | Chayka et al. | 198/468.8 X |
| 3,985,223 | 10/1976 | Forcella et al. | 198/406 |
| 4,516,900 | 5/1985 | Avey | 414/417 |
| 4,968,081 | 11/1990 | Beight et al. | 198/470.1 X |
| 5,102,009 | 4/1992 | Kato et al. | 221/68 |
| 5,172,802 | 12/1992 | Wells | 198/470.1 |
| 5,178,262 | 1/1993 | Merkli et al. | 198/470.1 X |
| 5,348,134 | 9/1994 | Wadell | 198/409 |

FOREIGN PATENT DOCUMENTS

| | | |
|---|---|---|
| 0401948 | 9/1924 | Germany. |
| 0336175 | 10/1930 | United Kingdom. |

Primary Examiner—James R. Bidwell
Attorney, Agent, or Firm—Vogt & O'Donnell

[57] ABSTRACT

A gripping device reciprocates vertically towards and away from a table surface having at least one groove to grip and remove articles from the surface. The gripping device has two jaw members connected to a cylinder so that a first jaw member is in a fixed position relative to the cylinder and so that a second jaw member is movable towards and away from the first jaw member. The gripping device and its jaw members and the table surface are configured and positioned so that, in operation, upon movement of the cylinder and jaw members towards the table surface, the first jaw member contacts an article positioned on the table surface having an edge positioned over the groove to move the article into the groove and tilt the article so that a portion of a bottom surface of the article is lifted from the table surface, and the second jaw member then moves towards the first jaw member and the tilted article to contact the bottom surface of the tilted article so that opposing surfaces of the tilted article are gripped between the jaw members for removing the gripped article from the table surface.

11 Claims, 2 Drawing Sheets

GRIPPING AND REMOVING ARTICLES FROM A GROOVED SURFACE

CROSS REFERENCE TO RELATED APPLICATION

This is a continuation application of application Ser. No. 08/146,954, filed Nov. 3, 1993, now U.S. Pat. No. 5,348,134.

BACKGROUND OF THE INVENTION

The present invention relates to a gripping device, more particularly for picking up frozen food products and releasing them.

Existing picking units comprising vacuum suction cups are not fully reliable for picking up products with an uneven or grooved surface, nor for products which can let air through owing to the presence of slits or holes therein. In addition, rapid movements transverse to the suction force cause a hazard.

SUMMARY OF THE INVENTION

The present invention provides a process and assembly which avoid the above-mentioned difficulties.

The process of the present invention includes transporting an article on a table surface having a groove therein to a position so that an edge of the article is positioned over the groove, moving two jaw members of a gripping device toward the table surface and contacting the article with a first jaw member to move the edge of the article into the groove and tilt the article so that a portion of a bottom surface of the article is lifted from the table surface, moving a second jaw member towards the first jaw member and the bottom surface of the tilted article to contact the bottom surface of the tilted article so that opposing surfaces of the tilted article are gripped between the first and second jaw members, moving the gripping device and gripped article away from the table surface and then, moving the second jaw member away from the first jaw member to release the gripped article from the jaw members.

The assembly of the present invention comprises a gripping device and a table having a top surface having a groove therein which enables articles to be tilted and then gripped and removed by the gripping device. The gripping device is positioned for reciprocating towards and away from the table surface, and has first and second jaw members which extend to jaw member ends, a cylinder containing a reciprocative piston, means for connecting the first jaw member fixedly with the cylinder, means for connecting the second jaw member with the cylinder so that the second jaw member is movable towards and away from the first jaw member, means for reciprocating the cylinder with the jaw members vertically towards and away from the table surface and means for activating movement of the piston. The jaw members, cylinder and piston, connecting means, reciprocating means, activating means and table surface are configured and positioned so that a portion of the second jaw member is positioned adjacent the cylinder piston so that upon movement of the piston, the second jaw member moves towards and away from the first jaw member, and the jaw member ends are displaced from the cylinder so that a vertical distance between the first jaw member end and the cylinder is greater than a vertical distance between the second jaw member end and the cylinder.

The cylinder, jaw members and groove of the table surface are positioned so that upon an article being positioned on the table surface so that an edge of the article is positioned over the groove and upon movement of the cylinder and jaw members towards the table surface for gripping the article, the first jaw member contacts and pushes the article so that the article moves into the groove and tilts so that a portion of a bottom surface of the article is lifted from the table surface and so that the second jaw member moves from a position displaced away from the tilted article and first jaw member towards the tilted article and first jaw member to contact the bottom surface of the tilted article so that the opposing surfaces of the tilted article are gripped between the jaw members for removing the gripped article from the table surface.

DESCRIPTION OF PREFERRED EMBODIMENTS

The means connecting the jaw member to the cylinder may be a pivot positioned between the ends of the jaw member so that the part of the first jaw member above the pivot is impelled by the cylinder piston.

The means for maintaining the first jaw member in the fixed position relative to the cylinder may be any suitable conventional fixing means and conveniently includes a plate connected to the cylinder.

The fixed table positioned beneath the jaw members is preferably provided with a plurality of consecutive spaced grooves. Desirably, the grooves are spaced from one another by a distance corresponding substantially to the length of each product so that the upstream and downstream edges of successive products transported on the table overlie the grooves. Means are provided for transporting a product downstream on the fixed table to locate it with its upstream or downstream edge overlying the groove.

The means for reciprocating the cylinder may be, for example, an electric motor or a pneumatic cylinder. Advantageously, there are a plurality of cylinders. Means also are provided for activating the cylinder to close and open the jaws, and such may conveniently be a pneumatic valve. Advantageously, the first jaw member is connected to the second jaw member below the pivot by a spring.

The grooves are preferably provided with upstream and downstream planar walls, the inside surfaces of which are at an acute angle to the surface of the table, e.g., from 20° to 70° and especially from 30° to 60°. This enables the part of the tilted product in the groove to rest firmly against the surface of a wall of the groove.

Advantageously, the gripping parts of the jaw members are positioned at an angle suitable for gripping the tilted product in the groove.

Conveniently, the cylinder is also adapted to reciprocate horizontally by moving from an upwardly retracted position above the table, with the closed jaws gripping the products, to a position above a means for receiving the product, at which position, the jaws open to release the product onto the receiving means, and then by moving back to the upwardly retracted position above the table. The means for receiving the product may be, for instance, a pick-up or distribution conveyor for transporting the product to a packing machine, e.g., directly to the pockets of a MULTIVAC packing machine.

The gripping device of the present invention is especially suitable for gripping resilient food products, such as frozen sawn fish pieces formed from a frozen fish block which has travelled beneath a saw. One advantage of the device of the present invention, when gripping frozen sawn fish pieces, is that the adjoining individual sawn pieces, which are often stuck together, can be broken apart by the action of the first jaw member contacting the end of the fish piece and pushing that end into a transverse groove.

The present invention is further illustrated by way of example only with reference to the accompanying drawings.

DETAILED DESCRIPTION OF THE DRAWING FIGURES

Figure 1:
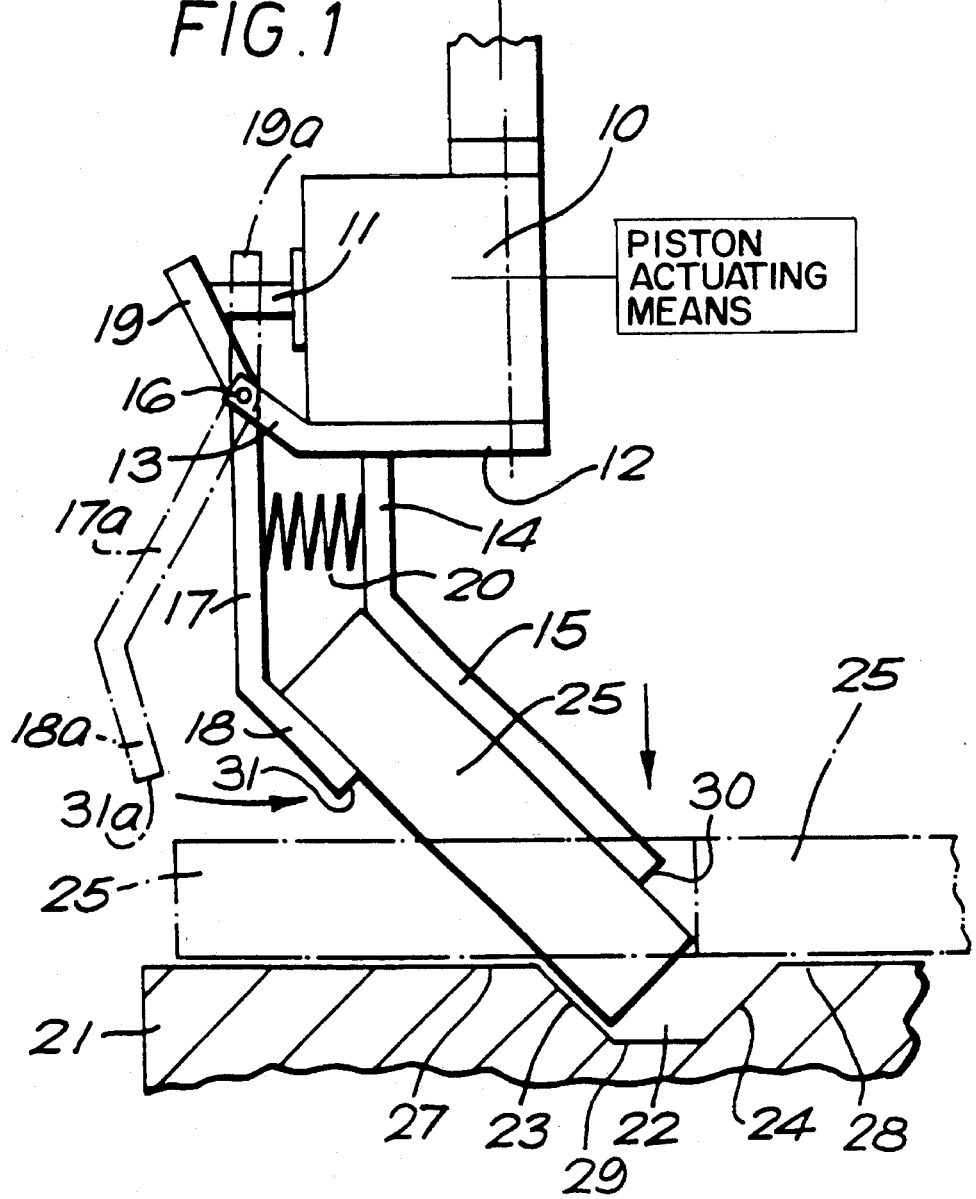
FIG. 1 represents a diagrammatic side view of a gripping device of the present invention.
Figure 2:
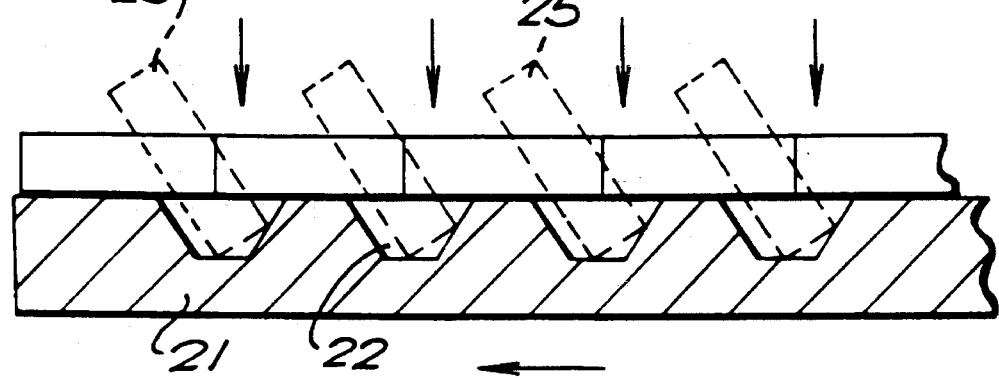
FIG. 2 represents a side view of a grooved table carrying tilted frozen fish pieces.

Referring to the drawings, FIG. 1 shows a pneumatic mini-cylinder 10, adapted to reciprocate vertically and horizontally, provided with a piston 11 and a plate 12 with an extending arm 13. Connected to the plate 12 is a fixed jaw member 14 with a gripping portion 15, and connected to the extending arm 13, by means of a pivot 16, is a jaw member 17 with a gripping portion 18 and an upper portion 19 contacting the piston 1. (As will be appreciated, reference numerals 17a, 18a and 19a depict the open jaw position by the broken lines in FIG. 1). As illustrated in the drawing Figures, gripping portions 15 and 18 extend at an angle from upper portions which are connected with the means for connecting the jaw members with the cylinder.

Figure 5:
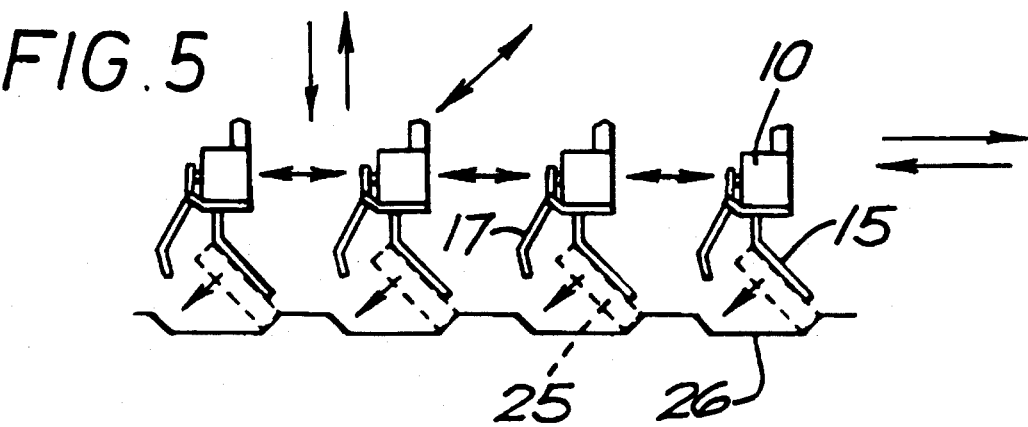
FIG. 5 represents a side view of the device showing four tilted fish pieces being released from open jaws onto a conveyor belt.

The jaws are connected by extension spring 20. A fixed table 21 is provided with grooves 22 positioned beneath the gripping portion 15 of the fixed jaw member 14 and having an angled downstream wall 23 and an upstream wall 24. Sawn frozen fish pieces 25 travel on the table 21. A conveyor 26 leading to a Multivac packing machine is shown in FIG. 5.

Thus, as illustrated in drawing FIGS. 1–4, the table surface grooves are defined by surface portions which are recessed from adjacent article transport support surfaces 27 and 28 (see FIG. 1) and which define a longitudinally extending planar base surface 29 and surfaces 23 and 24 which extend between base surface 29 and article transport surfaces 27 and 28.

As further illustrated in FIG. 1, jaw members 14 and 17 (17a) are configured to extend to jaw member ends 30 and 31 (31a), respectively. The jaw member ends are displaced a distance from cylinder 10 so that a vertical distance between cylinder 10 and end 30 of fixed first jaw member 14 is greater than a vertical distance between cylinder 10 and end 31 (31a) of second jaw member 17 (17a). The first jaw member end 32 is positioned relative to groove 22 of table 21 so that upon movement of the cylinder and jaw members towards the table surface and groove 22, first jaw member end 30 contacts and pushes and moves the article into groove 22 and tilts the article so that upon movement of the second jaw member from the reference numeral 17a depiction position to the reference numeral 17 depiction position, and thus, towards first jaw member 14 to contact the article, second jaw member 17 contacts the bottom surface of the tilted article so that the article is gripped between the jaw members for removing the gripped article from the table surface.

Figure 3:
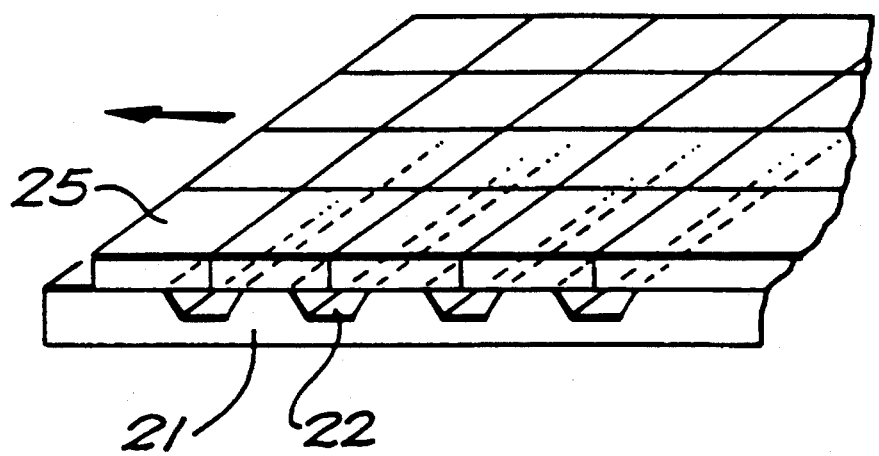
FIG. 3 represents a perspective view of a grooved table carrying sawn frozen fish pieces.
Figure 4:
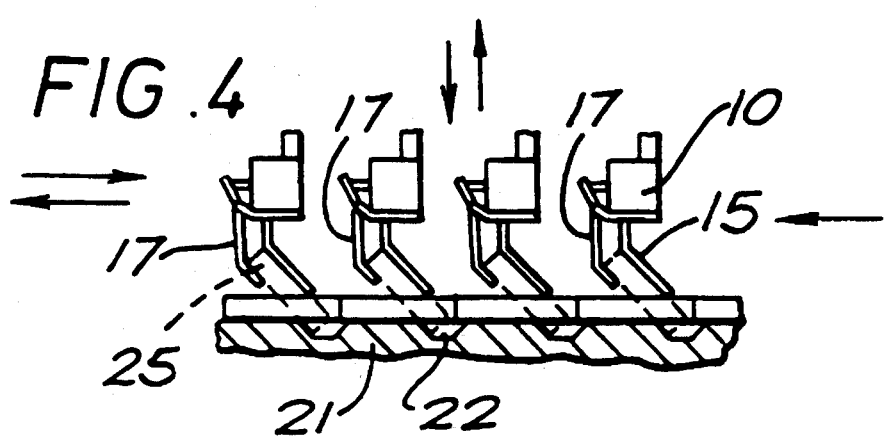
FIG. 4 represents a side view of the device showing four tilted fish pieces being gripped by closed jaws.

In addition, FIG. 3 illustrates a plurality of spaced-apart grooves 22 which extend longitudinally and have longitudinal axes parallel one to another. In FIG. 3, each of the plurality of product articles 25 is depicted as having an edge positioned over a groove 22 for being contacted and tilted by one of a plurality of gripping devices 10, and as illustrated in FIG. 4, the first fixed jaw member 14 of each gripping device 10 is positioned relative to the groove to effect the contact and tilting. FIG. 5 illustrates a conveyor 26 for leading to a MULTIVAC packing machine and release of fish pieces from jaw members 14 and 17.

In operation, fish blocks (not shown) are sawn into fish pieces 25 which travel to the left in the drawings on the grooved table 21 and in a direction transverse to a longitudinal extent of the grooves until the upstream and downstream edges of the fish pieces 25 are positioned to overlie the grooves 22 on the table 21 (see FIG. 3). As the leading fish piece 25 passes beneath the jaw members 14, 17, the cylinder 10 is in the raised position and the jaw members are in the open position, as depicted by the broken lines 17a, 18a, 19a in FIG. 1, and the piston 11 is in the retracted position.

The cylinder 10 descends together with the jaw members 14, 17, and the lower end of the gripping portion 15 of the fixed jaw 14 contacts the upstream end of the fish piece 25 and pushes it downwards into the groove 22 causing the fish piece to tilt at an angle equivalent to that of the downstream wall 23 while it is held in that position by the gripping portion 15. A pneumatic valve (not shown) activates the piston 11 to urge the upper part 19a of the jaw member 17a so that it pivots about the pivot 16 so that the gripping portion moves from position 18a to position of portion 18 causing the jaws to close so that the tilted fish piece 25 is gripped by the gripping portions 15, 18.

The cylinder 10 ascends together with the closed jaws gripping the tilted fish piece 25 and then travels horizontally to a position above the conveyor 26 (see FIG. 5), whereupon the piston 11 retracts causing jaw member 17 to open by pivoting about the pivot 16 and to release the fish piece on to the conveyor 26. The cylinder 10 with the jaws open then returns horizontally to a position above the table 21 (see FIG. 4) whereupon the process is repeated.

The vertical and horizontally reciprocating movements of the cylinder may be controlled by an electric motor or a pneumatic cylinder and the whole operation may be synchronized by a computer.

I claim:

1. A process for gripping and removing articles from a surface comprising:

transporting an article on a table surface having a groove therein to a position so that an edge of the article is positioned over the groove;

moving two jaw members of a gripping device vertically toward the table surface and contacting the article with a first jaw member to move the edge of the article into the groove and tilt the article so that a portion of a bottom surface of the article adjacent the table surface is lifted from the table surface;

moving a second jaw member towards the first jaw member and the bottom surface of the tilted article to contact the bottom surface of the tilted article so that opposing surfaces of the tilted article are gripped between the first and second jaw members;

moving the jaw members and gripped article away from the table surface; and moving the second jaw member away from the first jaw member to release the gripped article from the jaw members.

2. A process according to claim 1 wherein the bottom surface portion of the article is tilted at an angle of from 20° to 70° with respect to the surface from which it was lifted.

3. A process according to claim 2 wherein the angle is from 30° to 60°.

4. A process according to claim 1 wherein the gripped article is released onto a conveyor.

5. An assembly for gripping and transporting articles comprising:

a table having a table surface having a groove therein;

a gripping device positioned for reciprocating towards and away from the table surface comprising:

first and second jaw members which extend to jaw member ends, a cylinder containing a reciprocative piston, means for connecting the first jaw member with the cylinder, means for connecting the second jaw member with the cylinder so that the second jaw member is movable towards and away from the first jaw member, means for reciprocating the cylinder with the jaw members vertically towards and away from the table surface and means for activating movement of the piston, wherein the jaw members, cylinder and piston, connecting means, reciprocating means, activating means and table surface are configured and positioned so that:

(i) a portion of the second jaw member is positioned adjacent the cylinder piston so that upon movement of the piston, the second jaw member moves towards and away from the first jaw member; and (ii) the jaw member ends are displaced from the cylinder so that a vertical distance between the first jaw member end and the cylinder is greater than a vertical distance between the second jaw member end and the cylinder, and the cylinder, jaw members and groove in the table surface are positioned so that upon an article being positioned on the table surface so that an edge of the article is positioned over the groove and so that upon movement of the cylinder and jaw members towards the table surface for gripping the article, the first jaw member contacts and pushes the article so that the article moves into the groove and tilts so that a portion of a bottom surface of the article is lifted from the table surface and so that the second jaw member moves from a position displaced away from the tilted article and first jaw member towards the tilted article and first jaw member to contact the bottom surface of the tilted article so that opposing surfaces of the tilted article are gripped between the jaw members for removing the gripped article from the table surface.

6. An assembly according to claim 5 wherein the means for connecting the second jaw member to the cylinder comprises a plate connected to the cylinder and wherein the second jaw member is pivoted to the plate.

7. An assembly according to claim 5 further comprising a spring connected to the first and second jaw members and wherein the second jaw member is pivoted at a position between the piston and a position of the connection of the second jaw member and spring.

8. An assembly according to claim 5 wherein the groove is defined by surfaces which are recessed from adjacent planar article transport support surfaces and which define longitudinally extending surfaces which extend transversely from the support surfaces at an angle of from 20° to 70° to a longitudinally extending groove base surface.

9. An assembly according to claim 8 wherein the angle is from 30° to 60°.

10. An assembly according to claim 5 wherein there are a plurality of grooves which extend longitudinally and which are spaced apart and have longitudinal axes parallel one to another and wherein there are a plurality of gripping devices positioned for contacting, tilting, gripping and removing articles from the table surface.

11. An assembly according to claim 5 wherein each jaw member has a gripping portion which extends at an angle from a portion connected with the means for connecting each jaw member with the cylinder.

* * * * *